Figure 1:
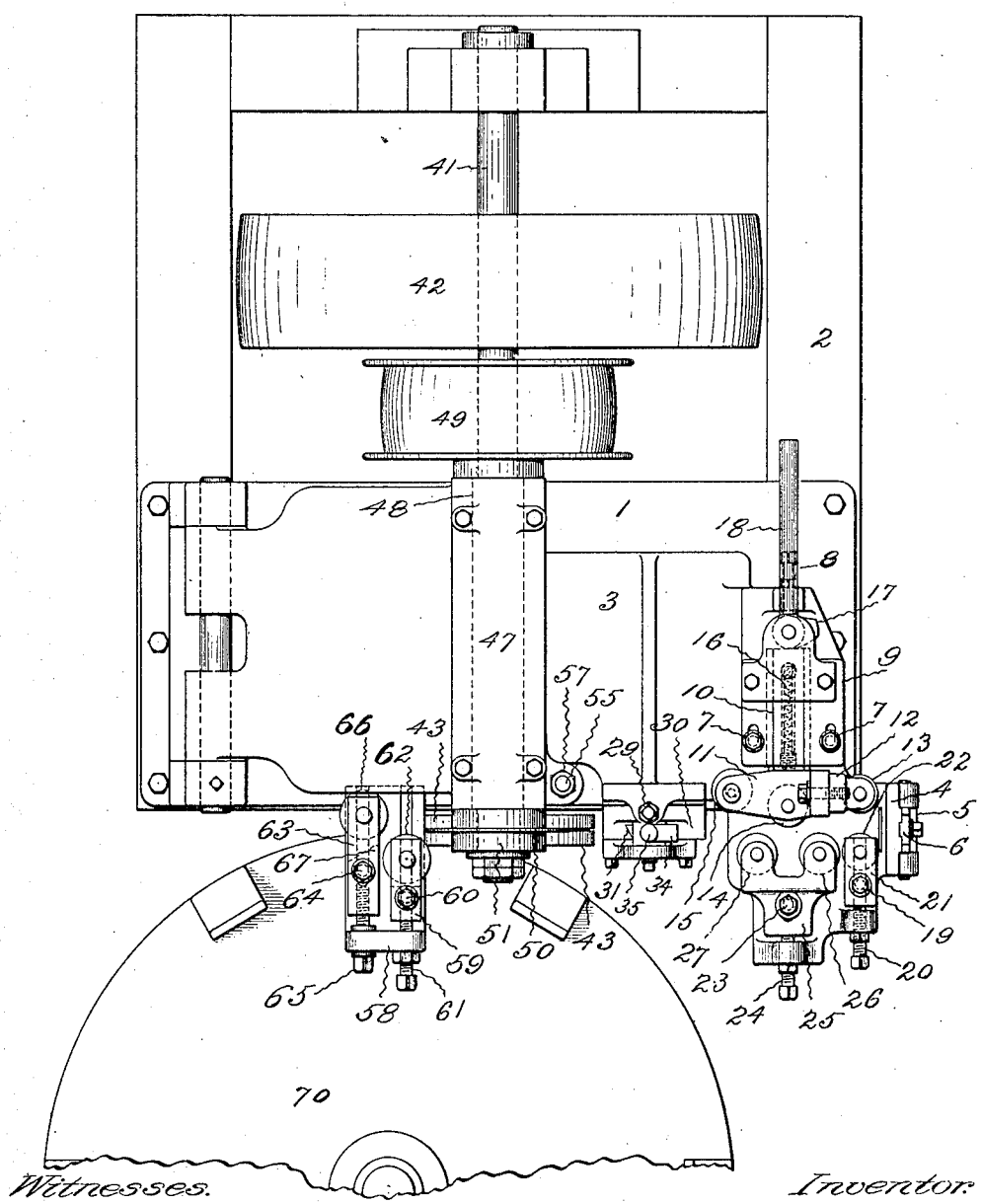

No. 871,257. PATENTED NOV. 19, 1907.
G. J. CAPEWELL.
SCALING MACHINE.
APPLICATION FILED FEB. 15, 1906.

6 SHEETS—SHEET 1.

Witnesses.
C. F. Storrs
Ethel M. Lowe

Inventor.
George J. Capewell
per
Harry R. Williams
Attorney.

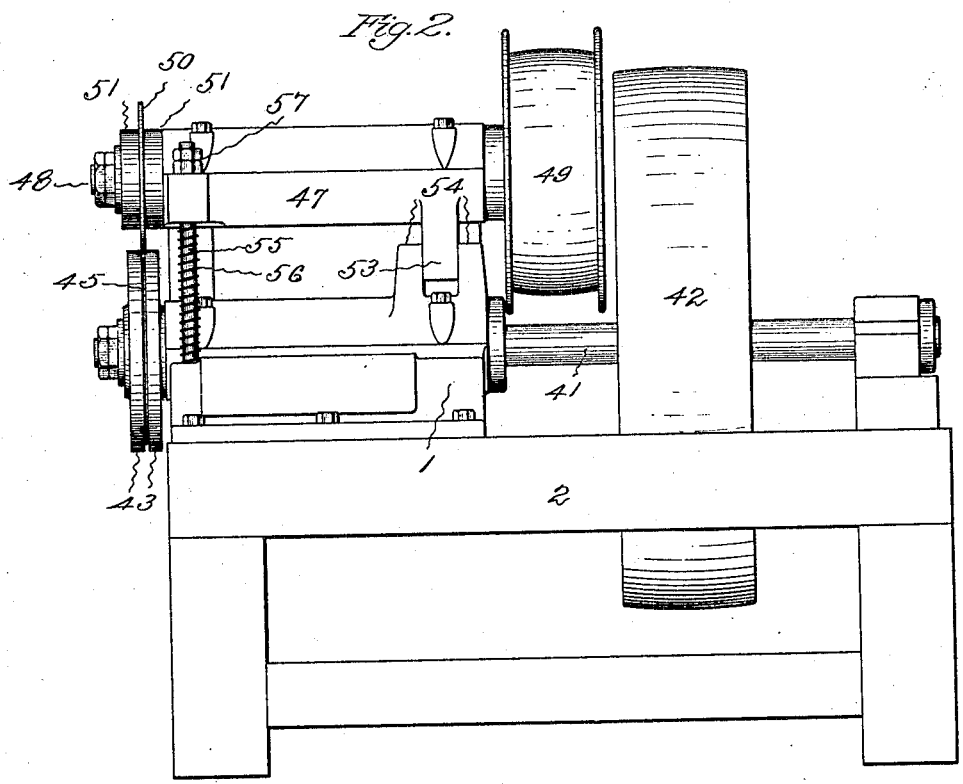

No. 871,257. PATENTED NOV. 19, 1907.
G. J. CAPEWELL.
SCALING MACHINE.
APPLICATION FILED FEB. 15, 1906.
5 SHEETS—SHEET 3.
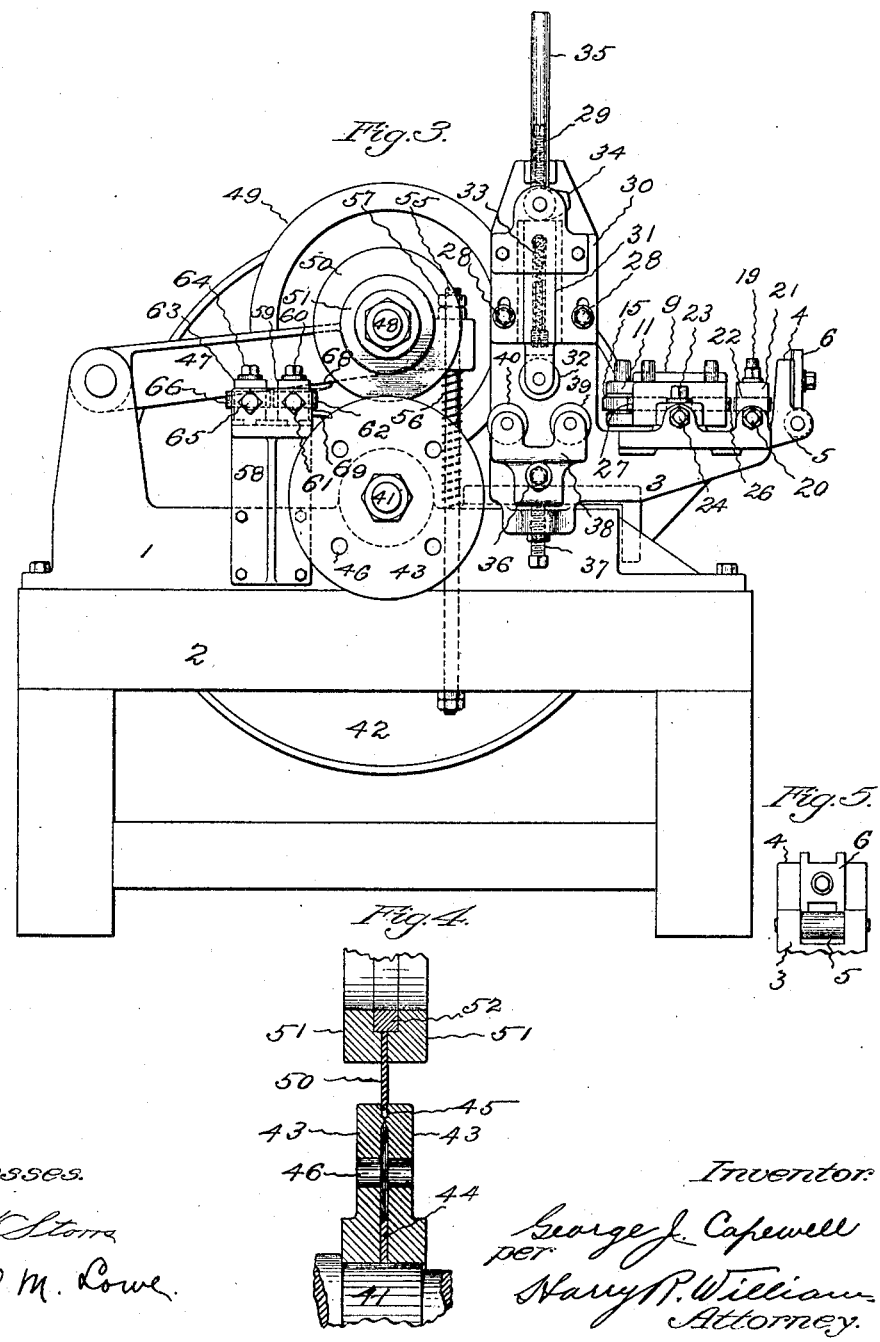

No. 871,257.
PATENTED NOV. 19, 1907.
G. J. CAPEWELL.
SCALING MACHINE.
APPLICATION FILED FEB. 15, 1906.
5 SHEETS—SHEET 4.
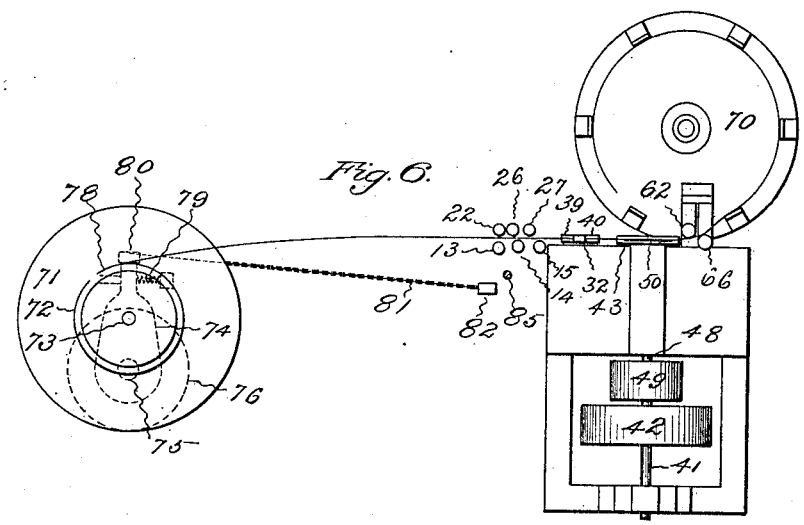
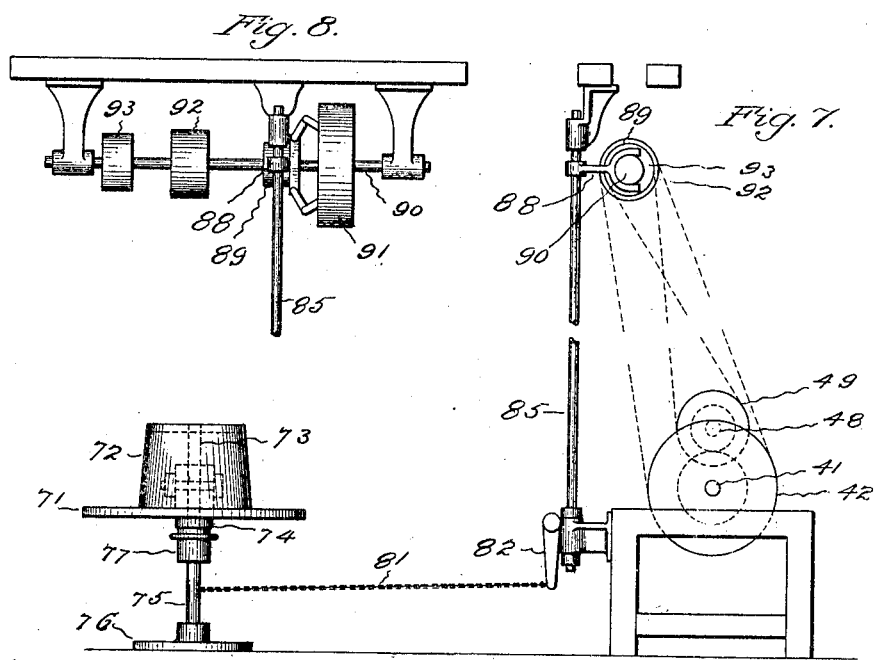

No. 871,257. PATENTED NOV. 19, 1907.
G. J. CAPEWELL.
SCALING MACHINE.
APPLICATION FILED FEB. 15, 1906.
5 SHEETS—SHEET 5.
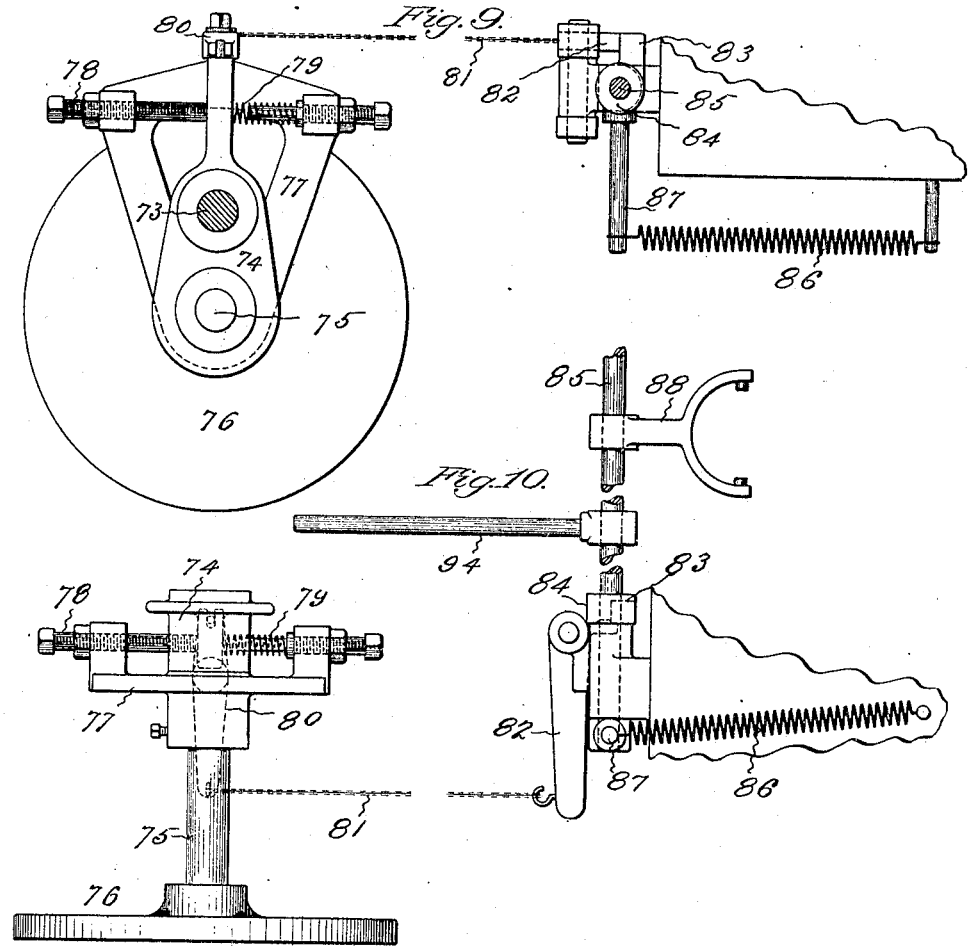

UNITED STATES PATENT OFFICE.

GEORGE J. CAPEWELL, OF HARTFORD, CONNECTICUT, ASSIGNOR TO THE CAPEWELL HORSE NAIL COMPANY, OF HARTFORD, CONNECTICUT, A CORPORATION OF CONNECTICUT.

SCALING-MACHINE.

No. 871,257.           Specification of Letters Patent.           Patented Nov. 19, 1907.

Application filed February 15, 1906. Serial No. 301,249.

*To all whom it may conecrn:*

Be it known that I, GEORGE J. CAPEWELL, a citizen of the United States, residing at Hartford, in the county of Hartford and State of Connecticut, have invented a new and useful Scaling-Machine, of which the following is a specification.

This invention relates to a machine which is designed to remove scale from metal rods by crimping or bending the rods back and forth in various directions.

The object of the invention is to provide a simple, easily adjusted and efficient machine, which will break off the scale that forms as a result of heating, from continuous lengths of either circular or angular iron or steel rods, by sharply bending the rods back and forth in different planes, and will deliver the rods in a clean and desirable condition.

The machine is adapted to be used for removing scale from rolled or drawn iron or steel rods which are to be used for any purpose, but the machine which is illustrated in the drawings as embodying the invention was particularly designed for removing the scale from rods that are to be used for forming horse nails, which, owing to their characteristics, the nature of their use, and the methods employed in their production, require clean malleable rods of high quality.

The rod is drawn from a coil on a supply reel into the machine illustrated, through a guide opening and after passing between guiding rolls which hold the rod in proper alinement passes between rolls which crimp and straighten it flatwise, then between rolls which crimp and straighten it edgewise, then between the feed rolls which draw it along and true it both flatwise and edgewise and clean up its surfaces, and then between rolls which coil it onto a receiving table in desirable condition for the subsequent operations, these actions taking place continuously, and the machine stopping if the rod does not feed properly.

Figure 1 of the drawings shows a plan of the machine, with the reel and driving and stopping mechanisms omitted. Fig. 2 shows a side elevation of the same without the guiding and crimping rolls. Fig. 3 shows a front elevation without the reel, table and driving and stopping mechanisms. Fig. 4 shows small sections of the feeding rolls. Fig. 5 shows a view of the guide through which the rod enters the machine. Fig. 6 shows a diagrammatic plan of the machine and the supply reel and receiving table, illustrating the path of the rod. Fig. 7 shows a diagrammatic elevation of the supply reel and the driving and stopping mechanisms. Fig. 8 shows an elevation of the counter-shaft and its appurtenances. Fig. 9 shows a plan of the base of the supply reel and the stop trip. Fig. 10 shows a side elevation of the base of the supply reel and the stop trip. And Fig. 11 shows a detail of the trip.

The bed 1 of the machine shown is fastened upon a substantial frame 2. On one side of the top near the front of the bed is a bracket 3. Extending upwardly on the side edge of a horizontally extending portion of this bracket is a wall 4. At the lower part of an opening through this wall is a roll 5 on a horizontal axle and above the roll and bolted so that it may be adjusted vertically is a guide 6. The rod enters the machine over this roll and through the guide and the opening in the supporting wall. Held by bolts 7 so that it may be adjusted by a screw 8 toward the front and back on top of the horizontal portion of the bracket is a block 9. This block holds a slide 10 which is movable forwardly and rearwardly and which on its front end has a laterally extending head 11. On one side of this is a bracket 12. This bracket is clamped so that it may be adjusted forwardly and rearwardly on the head and it carries a roll 13. Near the middle the head carries a roll 14 and on the other side the head carries a roll 15 that is preferably held by eccentric bearings so that it may be adjusted toward the front and back with relation to the other rolls carried by the head. A spring 16 is arranged between the slide and the block to draw the slide rearwardly. Back of the slide and supported by the block so as to move with it is a cam 17 which has a handle 18. When the handle is drawn toward the front the cam forces the slide forwardly so that the rolls carried by the head will be moved into the path of the rod that enters through the guide. When the handle is turned back the spring draws the slide rearwardly so that a rod can be easily threaded past the rolls carried by the head. Held on top of the front part of the horizontally extending portion of the bracket by a bolt 19 so that it may be adjusted forwardly and rearwardly by the screw 20 is a block 21 which carries a roll 22. Held to the top of the front part of the horizontal portion of the bracket by a bolt 23 so that it may be adjusted forwardly and rearwardly by a screw 24 is a yoke 25 carrying a pair of rolls 26 and 27. When the head is forward the two rolls 13 and 22 grip the rod as it passes the guide in such manner as to hold it straight while it passes through the crimping rolls. The rolls 26 and 14, and 27 and 15, are so adjusted with relation to each other that after the rod passes the guiding rolls it is given short bends or crimped horizontally and then straightened. The crimping of the rod in this manner cracks off the scale from the sides. Fastened by bolts 28 so that it may be adjusted vertically on a vertical extension of the bracket by a screw 29 is a block 30. Movable vertically in this block is a slide 31 which carries a roll 32. A spring 33 is arranged between the slide and the block to lift the slide. Mounted on the block above the upper end of the slide is a cam 34 with a handle 35. When the handle is raised the spring draws the slide upwardly. When the handle is turned down the cam forces the slide and the roll downwardly.

Secured to the front face of the upright portion of the bracket by a bolt 36 so that it may be adjusted vertically by the screw 37 is a yoke 38 bearing two rolls 39 and 40. When the handle is turned down the rolls 39, 32 and 40 are in such position with relation to each other that they crimp the rod vertically after it has passed the rolls which crimp it horizontally. This cracks off the scale from the edges of the rod. Held by suitable bearings fastened on the bed and on the frame is a horizontal shaft 41. This shaft near the back of the machine bears a pulley 42 and near the front of the machine carries the lower feed roll. This feed roll is formed of two disks 43 which are removably clamped upon the shaft with a washer 44 between so as to hold them slightly separated. In the periphery of this feed roll and produced by recessing a portion of the edge of each disk is a groove 45 which receives the rod as it travels through the machine. The disks are set together so that the rod is firmly gripped by the faces of the disks which form the side walls of the groove, yet a small space is left between the disks to permit scale to drop inwardly from the groove, and openings 46 are made through the disks to allow such scale and dust as collects to escape from between the disks. Separating washers of different thicknesses are inserted between these disks in order to adapt this feed roll to rods of different thicknesses.

Supported by bearings in a frame 47 that is hinged to the bed near one side of the machine is a shaft 48. On the rear end of this shaft is a pulley 49 and on the front end is the upper feed roll. This feed roll has an annular flange 50 which is clamped between plates 51 that are fastened to the shaft. Between these plates is a hardened collar 52 which is provided to form a solid backing for the flange. The periphery of the annular flange of the upper feed roll runs in the groove in the periphery of the lower feed roll and holds the rod down tightly in the groove so that the bite on the rod as the rolls rotate will draw the rod between the guiding, crimping and coiling rolls without crushing, bending or marring it. The frame which supports the shaft of the upper feed roll near the middle of the machine has a lug 53 which extends between ears 54 that project upwardly from the bed for the purpose of guiding the free end of the frame in its movements up and down. Extending through the free end of the frame and the bed near the front of the machine is a rod 55 and on this is a spring 56 which thrusts against the under side and lifts the free end of the frame. The upper end of this rod is threaded and bears nuts 57 which are employed for the purpose of holding down the frame and keeping the feed rolls in proper relation when they are working but which when removed allow the frame and the upper feed roll to be lifted by the spring. The diameters of the pulleys on the feed roll shafts are proportioned relatively to the diameters of the feed rolls so that the peripheral speeds of the feed rolls are the same.

Bolted to the front of the bed at one side of the feed rolls is a bracket 58. On the top of this bracket is a slide 59 which is held in position by a bolt 60 and may be adjusted forwardly and backwardly by a screw 61. This slide in front of the path of the rod has a roll 62. A slide 63 is fastened by a bolt 64 to the top of this bracket so that it may be adjusted forwardly and backwardly by a screw 65. This slide back of the path of the rod has a roll 66. The opening through this slide is so shaped as to form a horn 67 in front of the roll 66. After the rod leaves the feed rolls it passes between the guiding fingers 68 and 69 which are secured to the bracket and then between the rolls 62 and 66 which are adjusted to such positions that they coil the rod upon the rotatable receiving table 70.

The supports for the guiding crimping, feeding, and coiling rolls of this machine are readily adjusted for rods of different widths and thicknesses and for use on rods which are round, square or other shape in cross-section, and these rolls can be quickly separated to allow a rod to be easily strung through the machine and as quickly closed so that the rolls will be in the proper positions to give the rods the necessary crimps to break off the scale.

The rods which this machine is designed to scale are comparatively stiff and strong and they are drawn through at very high speed. The coils in which they are wound as they reach the factory or after they have been taken from an annealing oven are often very much tangled and kinked and frequently the tangles do not come apart and the kinks catch so as to prevent the rods from unwinding from the supply reel. This is an element of considerable moment for if the machine continues to run either the machine will be damaged or the supply reel broken or pulled from its foundation and dragged against the machine. To eliminate this trouble the feed rolls must be stopped the instant there is an excessive strain on the rod due to its failure to promptly uncoil from the supply reel. For this purpose the feed roll driving mechanism and the supply reel are connected by a stop mechanism.

The supply reel shown consists of a disk 71 and a drum 72, and it is mounted on a stud 73 which projects up from an arm 74 that is pivotally mounted on the post 75 supported by the base 76. A yoke 77 is fixed on the post below the swinging arm that supports the reel. This yoke near its outer end on one side has an adjusting screw 78, and on the other side has a spiral spring 79, which thrusts against a portion of the reel carrying arm and holds it with a yielding pressure against the end of the adjusting screw, so that under normal conditions the reel is held in a fixed position. Pivotally mounted on the outer end of the yoke is a lever 80 the upper end of which is engaged by the outer end of the reel supporting arm. The lower end of this lever is connected by a chain 81 with the lower end of a trip lever 82 which is pivoted to the frame of the machine and has a shoulder which is arranged to normally engage the lug 83 which projects from the collar 84 on the vertical shaft 85. A spring 86 is connected with the pin 87 so as to tend to rotate this shaft against the trip. Near the upper end the vertical shaft has a forked arm 88 which engages the clutch collar 89 that is mounted on the counter-shaft 90 adjacent to the driving pulley 91, which counter-shaft bears pulleys 92 and 93 that are belted to the pulleys 42 and 49 on the feed roll shafts.

Should the rod fail to uncoil from the supply reel by reason of its kinks or tangles the draft of the feed rolls on the rod will pull the reel and cause it to overcome the pressure of the spring and to swing about the axis of its supporting base. The swinging of the reel in this way will cause the lever which engages the arm which supports the reel to oscillate and cause the chain to pull the trip lever and release the lug and allow the spring to rotate the shaft. When the shaft is rotated in this way the forked arm causes the clutch to release the driving pulley from the counter-shaft so that the machine will stop and relieve the supply reel from tension. As soon as the tension is eased by reason of the straightening out of the rod or from any other cause, the vertical shaft is turned back by means of the handle 94 and the clutch caused to connect the driving pulley with the counter-shaft and the trip to engage.

The invention claimed is:—

1. A scaling machine having rolls for crimping rod in one plane, rolls for crimping rod at right angles thereto, a feed roll with a groove for receiving rod, and a feed roll with a flange for holding rod in the groove, substantially as specified.

2. A scaling machine having rolls for guiding rod, rolls for crimping rod in one plane, rolls for crimping rod in another plane, a feed roll with a groove for receiving rod, and a feed roll with a flange for holding rod in the groove, substantially as specified.

3. A scaling machine having rolls for crimping rod back and forth, a feed roll formed of a pair of disks with a groove in its periphery, and a feed roll formed with a flange, the periphery of which is adapted to run in the groove between the disks of the other feed roll, substantially as specified.

4. A scaling machine having rolls for crimping rod back and forth, a feed roll supported by fixed bearings and having a pair of disks with a groove between them, and a feed roll supported by oscillatory bearings and having a single flange, the periphery of which is adapted to run in the groove between the disks of the other feed roll, substantially as specified.

5. A scaling machine having rolls for crimping rod back and forth, a feed roll supported by fixed bearings and having a pair of disks with a groove between them, a feed roll supported by oscillatory bearings and having a single flange, the periphery of which is adapted to run in the groove between the disks of the other feed roll, a spring for lifting the oscillatory bearings, and a bolt and nut for holding down the oscillatory bearings, substantially as specified.

6. A scaling machine having rolls for crimping rod in one plane, rolls for crimping rod in another plane, a feed roll adapted to grip the sides of the rod and a feed roll adapted to grip an edge of the rod, substantially as specified.

7. A scaling machine having a feed roll formed of a pair of disks spaced a short distance apart and recessed so as to provide a groove in the periphery of the roll and leave a thin opening at the bottom of the groove, and a feed roll formed with a flange, the periphery of which is adapted to run in the groove between the disks of the other feed roll, substantially as specified.

GEORGE J. CAPEWELL.

Witnesses:
HARRY R. WILLIAMS,
ETHEL M. LOWE.